(12) United States Patent
Rosene et al.

(10) Patent No.: US 7,093,593 B2
(45) Date of Patent: Aug. 22, 2006

(54) FLOATING SOLAR POOL HEATER

(76) Inventors: Richard C. Rosene, 40034 Gibraltar Dr., Murrieta, CA (US) 92562; Lora J. Rosene, 40034 Gibraltar Dr., Murrieta, CA (US) 92562

( * ) Notice: Subject to any disclaimer, the term of this patent is extended or adjusted under 35 U.S.C. 154(b) by 0 days.

(21) Appl. No.: 10/875,933

(22) Filed: Jun. 24, 2004

(65) Prior Publication Data

US 2006/0005830 A1     Jan. 12, 2006

(51) Int. Cl.
*F24J 2/46* (2006.01)
*F24J 2/36* (2006.01)
*E04H 4/14* (2006.01)

(52) U.S. Cl. .......................... 126/565; 126/625; 4/498

(58) Field of Classification Search ............... 126/565, 126/566, 561, 568, 901, 906, 624, 625; 4/493, 4/498, 499, 488, 496, 503; 441/40, 41
See application file for complete search history.

(56) References Cited

U.S. PATENT DOCUMENTS

| | | | | |
|---|---|---|---|---|
| 3,893,443 A | 7/1975 | Smith | | 126/565 |
| 3,949,095 A | 4/1976 | Pelehach et al. | | 126/565 |
| 3,984,881 A | 10/1976 | Gerlach | | 126/565 |
| 3,984,882 A | 10/1976 | Forman et al. | | 126/565 |
| 4,022,187 A | 5/1977 | Roberts | | 126/565 |
| 4,033,326 A * | 7/1977 | Leitner | | 126/565 |
| 4,060,070 A * | 11/1977 | Harter | | 126/660 |
| 4,146,015 A | 3/1979 | Acker | | 126/565 |
| 4,222,366 A | 9/1980 | Acker | | 126/565 |
| 4,284,060 A | 8/1981 | McCluskey | | 126/565 |
| 4,313,421 A | 2/1982 | Trihey | | 126/566 |
| 4,320,003 A | 3/1982 | Sanderson et al. | | 210/222 |
| 4,366,806 A * | 1/1983 | Acker | | 126/565 |
| 4,426,995 A | 1/1984 | Wilson | | 126/566 |
| 4,601,072 A | 7/1986 | Aine | | 4/499 |
| 5,059,296 A | 10/1991 | Sherman | | 204/229.8 |
| 5,511,536 A * | 4/1996 | Bussey et al. | | 126/565 |
| 5,938,900 A | 8/1999 | Reynolds | | 210/192 |
| 6,171,490 B1 | 1/2001 | Kim | | 210/223 |
| 6,385,791 B1 | 5/2002 | Bussey, Jr. et al. | | 4/498 |

FOREIGN PATENT DOCUMENTS

FR     2 539 493 A1 *   7/1984

* cited by examiner

*Primary Examiner*—Josiah C. Cocks
(74) *Attorney, Agent, or Firm*—Calif Tervo; Palomar Patent

(57) ABSTRACT

A soft, flexible, solar pool heater for floating on water generally comprises independently inflatable outer ring and central portion. When chamber and cavity are inflated, the cavity is with the top and bottom planes of the ring. The ring can be inflated with water for holding the heater in a pool in winds. Holes through the central portion permit egress of air from under the central portion when the heater is placed on water. Valves for chamber and cavity are located near one edge such that the heater may be deflated by rolling from an edge opposite the valves. Magnets on the ring condition water and attach to similar floating heaters to form rafts.

32 Claims, 1 Drawing Sheet

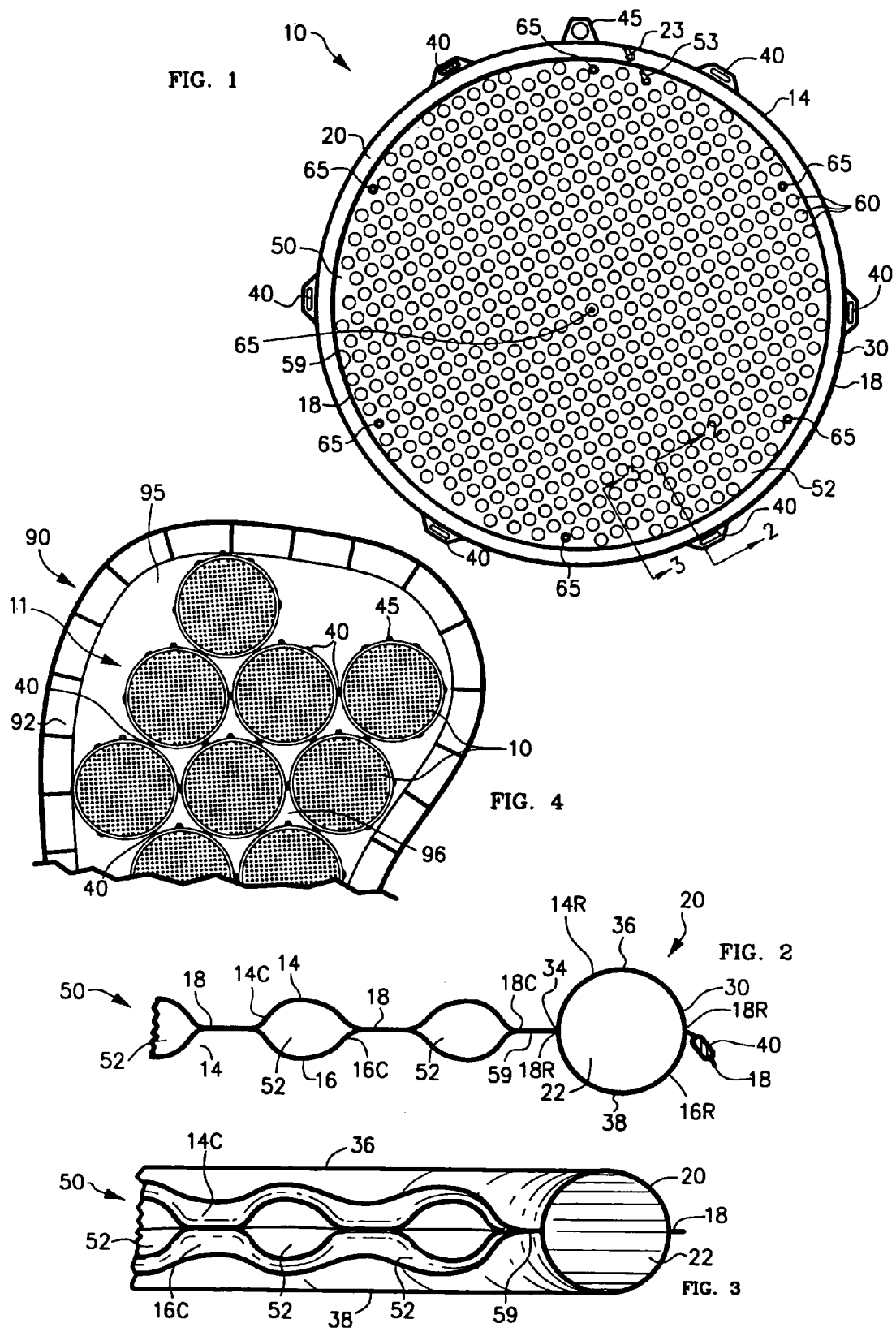

FLOATING SOLAR POOL HEATER

BACKGROUND OF THE INVENTION

It is desirable to cover pools, such as swimming pools, for various reasons, such as preventing evaporation and heat loss, and providing solar heating. Conventional pool covers have several shortcomings. Heavy covers are expensive. They are large and bulky and not easily used or stored. Pool covers of light material, such as of bubble pack type, typically cover an entire pool and project over the decking for anchoring the cover and preventing the cover from falling into the pool. Such covers are subject to winds that often lift them so as to dislocate or actually move the covers from the pool areas to other areas, e.g. neighbor's yard. Winds can pull such large light pool covers from under sand bags, and/or steel pipes as are commonly used. Further, any large cover can be dangerous for small children or animals, which can be trapped underneath.

Smaller solar pool heaters of the floating type have been proposed, but none appear to be marketed. The ones proposed have several disadvantages. Many have hard or rigid parts that are dangerous should a person fall into the pool and that make them bulky and difficult to store. Some of the larger ones have large air chambers that would encourage convection and heat loss. The lighter ones would tend to fly away in the wind. In general, they are bulky to store, difficult to deploy, and difficult to retrieve and remove.

Therefore, there it is desirable to have an improved floating pool heater that overcomes shortcomings in the prior art.

Magnets and magnetic fields have been known to treat water. Examples of magnetic treatment devices are disclosed in U.S. Pat. Nos. 3,951,807 and 4,153,559 in the name of Charles H. Sanderson and U.S. Pat. No. 5,059,296 to Mark Sherman. The magnet is said to condition the water by altering various minerals suspended in the water and to reduce the amount of oxidizer, such as chlorine, required Therefore, it is further desirable that the improved floating pool heater incorporate magnets for conditioning the water,

SUMMARY OF THE INVENTION

The invention is a soft, flexible, solar pool heater for floating on water and it generally comprises an inflatable outer ring and an inflatable central portion. The ring defines a chamber for holding fluid, such as air or water. The central portion is disposed centrally the ring and includes a periphery connected to the ring and an upper film and a lower film joined to the upper film to define a cavity for inflation with air. When chamber and cavity are inflated, the cavity is within the top and bottom planes of the ring. The chamber and the cavity are independently inflatable such that the ring can be inflated with water for holding the heater in a pool in winds.

Holes through the central portion permit egress of air from under the central portion when the heater is placed on water such that the lower film rests substantially on the water.

Valves for chamber and cavity are located near one edge such that the heater may be deflated by rolling from an edge opposite the valves.

Magnets on the ring condition water and attach to similar floating heaters to form rafts.

The features and advantages of the invention will be readily understood when the detailed description thereof is read in conjunction with the drawings wherein like reference numerals refer to like parts throughout.

BRIEF DESCRIPTION OF THE DRAWINGS

FIG. 1 is a top plan view of a preferred embodiment of the solar pool heater of the invention.

FIG. 2 is an enlarged cross section taken on line 2—2 of FIG. 1.

FIG. 3 is an enlarged sectional view taken on line 3—3 of FIG. 1.

FIG. 4 is a top plan view of a plurality of solar pool heaters of FIG. 1 in use in a swimming pool.

DETAILED DESCRIPTION OF THE INVENTION

With reference now to the drawings, FIG. 1 is a top plan view of a preferred embodiment of the solar pool heater 10 of the invention, FIG. 2 is an enlarged cross section taken on line 2—2 of FIG. 1, FIG. 3 is an enlarged sectional view taken on line 3—3 of FIG. 1, and FIG. 4 is a top plan view of a plurality of solar pool heaters 10 of FIG. 1 in use floating on water 95 in a swimming pool 90.

Heater 10 is soft and flexible so as to prevent no hazard should a person fall onto one either in pool 90 or outside of pool 90. Heater 10 generally comprises an outer ring 20 and central portion 50. A preferred embodiment of heater 10 is primarily constructed of upper film 14, such as upper film 14R of ring 20 and upper film 14C of central portion 50, and lower film 16, such as lower film 16R of ring 20 and lower film 16C of central portion 50. The film may be of thin plastic, such as of vinyl, bonded, such as by radio frequency bonding, at bonds 18 so as to form the general structure.

Outer ring 20 includes upper film 14R and lower film 16R bonded at bonds 18R to define a chamber 22 that is inflatable or turgesible with a fluid, such as a gas, such as air, or a liquid, such as water, such as pool water, through a valve, such as valve 23. Valve 23 may be any conventional valve, such as a bore and a stopper, which can control ingress and egress of fluid to and from chamber 22. Outer ring 20 includes a radially outward side 30, a radially inward side 34, a top 36, and a bottom 38. Top 36 and bottom 38 of ring 20 generally define spaced parallel planes.

Central portion 50 is disposed centrally of outer ring 20 and includes an upper film 14C, and a lower film 16C joined, such as around its periphery 59, to upper film 14C to define a cavity 52 therebetween for holding gas. Cavity 52 has an area in top view. Periphery 59 of central portion 50 is connected to ring 20, such as to radially inward side 34. Inflation and deflation means, such as valve 53, controls ingress and egress of gas, such as air, with cavity 52. When cavity 52 is inflated with air, heater 10 will float on water 95. Preferably, central portion 50 contains a single inflatable cavity 52 to facilitate inflation and deflation.

Connection means, such as plurality of spot welds 60, connect upper film 14C and lower film 16C central of periphery 59 such that upper film 14C and lower film 16C of cavity 52 are held in proximity and preferably held, as seen in FIG. 3, within the planes defined by the top 36 and bottom 38 of ring 20, when chamber 22 and cavity 52 are inflated with air and heater 10 is placed on the ground. This ensures: that heater 10 lies properly on water 95; that films 14C, 16C are held in close proximity for superior solar heating properties; and that heaters 10 are stackable when inflated. Close spacing of films 14C, 16C decreases heat loss from convection. Many other connection means, such as webbing or weld lines, are possible. However, welds allow the use of just two films and spot welds 60 provide the most area for cavity 52 while still holding films 14C, 16C in close proximity. Spot welds 60 are disposed in a grid so as to shape upper film 14C into an array of convex surfaces; a convex surface being located between each four welds 60. Each convex surface acts as a lens for intensifying the solar heating effect on lower film 16C. Chamber 22 and cavity 52 are inflatable and deflatable independently of each other.

Central portion 50 includes air escape means, such as a plurality of passages, such as through-holes 65 near periphery 59 and in the center of central portion 50, for allowing air to escape from below central portion 50 when heater 10 is deployed on water 95 and for allowing water on the top of central portion 50, such as from rain or from a decorative water fall, to drain. Holes 65 may be evenly spaced, such as every sixty degrees around the circumference of heater 10. Upon deployment, entrapped air under central portion 50 substantially escapes upward through holes 65 such that the center of central portion 50 sags slightly and central portion 50 is substantially in contact with water 95. Because of the flexibility of heater 10, at proper inflation, heater 10 will conform to waves in pool 90 so as to keep new air from entering under central portion.

Magnetic means, such as a plurality of spaced magnets 40, are connected to radially outward side 30 of ring 20, for conditioning water 95 and for releasably joining to magnetic means of other heaters 10 to join a plurality of heaters 10 to form a raft 11, as seen in FIG. 4. Magnets 40 may be uniformly spaced, such as every sixty degrees. When heater 10 is floating, magnet 40 is in contact with water 95 and produces a magnetic field in water 95 for conditioning water 95. Magnets 40 may be bonded between upper and lower film 14, 16. Magnets 40 of floating heaters 10 tend to attach to magnets 40 of other similar floating heaters 10 to form rafts 11. Rafts 11 facilitate removable of heaters 10 from pool 90, because when one heater 10 near pool side 92 is grasped the other heaters 10 in its raft 11 will also be pulled to pool side 92 as the grasped heater 10 is pulled out. Floating heaters 10 in a raft 11 are easily separated by a person in pool 90 such that a person falling into pool 95 is not trapped under raft 11. Heaters 10 may help float a person who accidentally falls into pool 90.

Heater 10 includes hanging means, such as hanger 45 attached to radially outward side 30 of ring 20, for hanging heater 10, such as on a peg on a wall, during storage. Hanger 45 may be constructed of bonded upper and lower film 14, 16 having a bore therethrough.

As described above, chamber 22 of outer ring 20 and cavity 52 of central portion 50 can be made from just two films, upper film 14 and lower film 16 welded together. Vinyl is the preferred film, but other films could be used. Preferably, upper film 14 has high transmissivity of sunlight so light easily enters chamber 22 and cavity 52. Upper film 14 may be clear plastic, such as 0.006" thick vinyl. Preferably, lower film 16 has high absorptivity of sunlight and is stronger, for puncture resistance. Lower film 16 may be 0.008" thick vinyl of dark color, such as blue. Preferably, films 14, 16 are resistant to breakdown from ultraviolet light.

Upper film 14 may be modified in manners known in the art which cause it to reflect downwardly much of the infrared energy impinging on its underside, thereby contributing to a "greenhouse" effect. Such reflectivity may be achieved by the use of films and coatings which provide unidirectional reflectivity. These films and coatings are well known in the art and are commonly applied to the windows of buildings to deter the entry of solar energy without preventing outward visibility. Mechanical, physical, molecular or chemical modifications of the film may also provide the appropriate reflectivity.

Lower film 16 is preferably opaque, absorptive of solar energy and of relatively high thermal conductivity. Lower film 16 may be provided with a material which will enhance its capability of absorbing solar energy to produce heat. Absorption-enhancing materials are well known and include carbon black, aluminum, copper and metal oxides. Lower film 16 may be modified so that the heat generated by the incident solar energy will be transmitted readily through the thickness. A liquid, powder or film may be laminated to the surface of lower film 16, and/or metallic particles may be added to lower film 16 to increase its thermal conductivity. Coatings and mixtures of powdered metals and metal oxides, as well as threads, filaments, filings and compounds placed on and/or located within lower film 16 may improve its thermal conductivity. Preferably, lower film 16 has a density for light absorption of about fifty percent such that about fifty percent of the light energy heats the surface and about fifty percent passes through for deep water heating. This can be varied for specific use.

A typical outside diameter for heater 10 is sixty inches, although other diameters could be used to better accommodate pools of various size and shape. The small amount of open water 96 between heaters 10 is desirable as a small amount of direct sunlight is necessary to prevent growth of undesirable alga such as mustard algae.

To prevent heater 10 from blowing away in high wind, outer ring 20 is filled with water, or is at least partially filled depending on the wind conditions, using valve 23. The weight of the water in outer ring 20 holds heater 10 within pool.

For temporary storage of heaters 10 during use of pool 90, heaters 10 may be stacked or may be hung by hangers 45. For long term storage and shipping, heaters 10 may be deflated by expelling air and water from chamber 22 and cavity 52 out valves 23, 53 respectively. Heater 10 is specifically designed for deflation by rolling from the edge opposite valves 23, 53.

From the foregoing description, it is seen that the present invention provides an extremely simple, efficient, reliable, and passive floating solar pool heater which heats the pool during sunlight and reduces heat loss at other times.

Although a particular embodiment of the invention has been illustrated and described, various changes may be made in the form, composition, construction, and arrangement of the parts herein without sacrificing any of its advantages. For example, although heater 10 is shown as circular in top view, it could have other shapes. Therefore, it is to be understood that all matter herein is to be interpreted as illustrative and not in any limiting sense, and it is intended to cover in the appended claims such modifications as come within the true spirit and scope of the invention.

We claim:

1. A soft, flexible, solar pool heater for floating on liquid comprising:
    an inflatable outer ring defining a chamber for holding fluid; said ring including:
        a valve for controlling ingress and egress of fluid with said chamber;
        a radially outward side including:
            magnetic means on said radially outward side of said ring for magnetic attachment to a similar floating heater;

a radially inward side;
a top; and
a bottom; and
an inflatable central portion disposed centrally said ring including:
   an upper film; and
   a lower film joined to said upper film to define a cavity therebetween for holding gas;
   a periphery connected to said ring; and
   a valve for controlling ingress and egress of gas with said cavity; said cavity when inflated with gas for floating said heater on liquid such that said heater floats on the liquid; said chamber and said cavity being independently fillable.

2. The heater of claim 1:
said top of said ring defining a top plane; said bottom of said ring defining a bottom plane; wherein, when chamber and said cavity are inflated with gas, said cavity is substantially entirely within the top and bottom planes.

3. The heater of claim 1 including:
magnet means on said ring adapted for contact with the liquid when said heater is floating for conditioning the liquid.

4. The heater of claim 1 including:
air escape means through said central portion for egress of air from under said central portion when said heater is placed on liquid such that said lower film rests substantially on the liquid.

5. The heater of claim 1:
said valves being located near one edge; said heater adapted for deflation by rolling from an edge opposite said valves.

6. The heater of claim 1 including:
air escape means through said central portion for egress of air from under said central portion when said heater is placed on liquid such that said lower film rests substantially on the liquid.

7. The heater of claim 1:
said valves being located near one edge; said heater adapted for deflation by rolling from an edge opposite said valves.

8. In combination:
a pool of liquid; and
a plurality or soft, flexible, solar pool heaters floating thereon; each said heater comprising:
   an inflatable outer ring defining a chamber inflated with fluid; said ring including:
      a valve for controlling ingress and egress of fluid with said chamber;
      a radially outward side;
      a radially inward side;
      a top;and
      a bottom; wherein said chamber is at least partially inflated with liquid;
   an inflatable central portion disposed centrally said ring including:
      an upperfilm; and
      a lower film joined to said upper film to define a cavity therebetween inflated with gas such that said heater floats on said liquid;
      a periphery connected to said ring; and
      a valve for controlling ingress and egress of gas with said cavity; said chamber and said cavity being independently fillable, and
      magnet means on said radially outward side of said ring; wherein said plurality of floating heaters are attached to one another by said magnet means.

9. The combination of claim 8:
said top of said ring defining a top plane; said bottom of said ring defining a bottom plane; wherein, when chamber and said cavity are inflated on the ground, said cavity is substantially entirely within the top and bottom planes.

10. The combination of claim 8:
said magnet means adapted for contact with the liquid when said heater is floating for conditioning the liquid.

11. The combination of claim 8 including:
air escape means through said central portion for egress of air from under said central portion when said heater is placed on liquid such that said lower film rests substantially on the liquid.

12. The combination of claim 8:
said valves being located near one edge; said heater adapted for deflation by rolling from an edge opposite said valves.

13. The combination of claim 8 wherein: said chamber and said cavity are independently fillable.

14. In combination:
a pool of liquid; and
a soft, flexible, solar pool heater floating thereon comprising:
   an inflatable outer ring defining a chamber inflated with fluid; said ring including:
      a valve for controlling ingress and egress of fluid with said chamber;
      a radially outward side;
      a radially inward side;
      a top; and
      a bottom; wherein said chamber is at least partially inflated with liquid;
   an inflatable central portion disposed centrally said ring including:
      an upper film; and
      a lower film joined to said upper film to define a cavity therebetween inflated with gas such that said heater floats on said liquid
      a periphery connected to said ring; and
      a valve for controlling ingress and egress of gas with said cavity; said chamber and said cavity being independently fillable; and
   magnet means on said ring for magnetic attachment to a similar floating heater.

15. The combination of claim 14:
said top of said ring defining a top plane; said bottom of said ring defining a bottom plane; wherein, when chamber and said cavity are inflated on the ground, said cavity is substantially entirely within the top and bottom planes.

16. The combination of claim 14 including:
magnet means on said ring adapted for contact with the liquid when said heater is floating for conditioning the liquid.

17. The combination of claim 14 including:
air escape means through said central portion for egress of air from under said central portion when said heater is placed on liquid such that said lower film rests substantially on the liquid.

18. The combination of claim 14:
said valves being located near one edge; said heater adapted for deflation by rolling from an edge opposite said valves.

19. A soft, flexible, solar pool heater for floating on liquid comprising:
an inflatable outer ring defining a chamber for holding fluid; said ring including:
a valve for controlling ingress and egress of fluid with said chamber;
a radially outward side including:
magnet means on said ring adapted for contact with the liquid when said heater is floating for conditioning the liquid;
a radially inward side;
a top; and
a bottom; and
an inflatable central portion disposed centrally said ring including:
an upper film; and
a lower film joined to said upper film to define a cavity therebetween for holding gas;
a periphery connected to said ring; and
a valve for controlling ingress and egress of gas with said cavity; said cavity when inflated with gas for floating said heater on liquid such that said heater floats on the liquid; said chamber and said cavity being independently fillable.

20. The heater of claim 19:
said top of said ring defining a top plane; said bottom of said ring defining a bottom plane; wherein, when chamber and said cavity are inflated with gas, said cavity is substantially entirely within the top and bottom planes.

21. A soft, flexible, solar pool heater for floating on liquid comprising:
an inflatable outer ring defining a chamber for holding fluid; said ring including:
a valve for controlling ingress and egress of fluid with said chamber
a radially outward side including:
magnet means on said radially outward side of said ring adapted for contact with the liquid when said heater is floating for conditioning the liquid and for magnetic attachment to a similar floating heater;
a radially inward side;
a top; and
a bottom; and
an inflatable central portion disposed centrally said ring including:
an upper film; and
a lower film joined to said upper film to define a cavity therebetween for holding gas;
a periphery connected to said ring; and
a valve for controlling ingress and egress of gas with said cavity; said cavity when inflated with gas for floating said heater on liquid such that said heater floats on the liquid; said chamber and said cavity being independently fillable.

22. The heater of claim 21:
said top of said ring defining a top plane; said bottom of said ring defining a bottom plane; wherein, when chamber and said cavity are inflated with gas, said cavity is substantially entirely within the top and bottom planes.

23. The heater of claim 21 including:
air escape means through said central portion for egress of air from under said central portion when said heater is placed on liquid such that said lower film rests substantially on the liquid.

24. The heater of claim 21:
said valves being located near one edge; said heater adapted for deflation by rolling from an edge opposite said valves.

25. In combination:
a pool of liquid; and
a soft, flexible, solar pool heater floating thereon comprising:
an inflatable outer ring defining a chamber inflated with fluid; said ring including:
a valve for controlling ingress and egress of fluid with said chamber;
a radially outward side;
a radially inward side;
a top; and
a bottom; wherein said chamber is at least partially inflated with liquid;
an inflatable central portion disposed centrally said ring including:
an upper film; and
a lower film joined to said upper film to define a cavity therebetween inflated with gas such that said heater floats on said liquid
a periphery connected to said ring; and
a valve for controlling ingress and egress of gas with said cavity; said chamber and said cavity being independently fillable; and
magnet means on said ring adapted for contact with the liquid when said heater is floating for conditioning the liquid.

26. The combination of claim 25:
said top of said ring defining a top plane; said bottom of said ring defining a bottom plane; wherein, when chamber and said cavity are inflated on the ground, said cavity is substantially entirely within the top and bottom planes.

27. The combination of claim 25 including:
air escape means through said central portion for egress of air from under said central portion when said heater is placed on liquid such that said lower film rests substantially on the liquid.

28. The combination of claim 25:
said valves being located near one edge; said heater adapted for deflation by rolling from an edge opposite said valves.

29. In combination:
a pool of liquid; and
a soft, flexible, solar pool heater floating thereon comprising:
an inflatable outer ring defining a chamber inflated with fluid; said ring including:
a valve for controlling ingress and egress of fluid with said chamber;
a radially outward side;
a radially inward side;
a top; and
a bottom; wherein said chamber is at least partially inflated with liquid;
an inflatable central portion disposed centrally said ring including:
an upper film; and
a lower film joined to said upper film to define a cavity therebetween inflated with gas such that said heater floats on said liquid a periphery connected to said ring; and a valve for controlling ingress and egress of gas with said cavity; said chamber and said cavity being independently fillable; and magnet means on said radially outward side of said ring adapted for contact with the liquid when said heater is floating for conditioning the liquid and for magnetic attachment to a similar floating heater.

30. The combination of claim 29:

said top of said ring defining a top plane; said bottom of said ring defining a bottom plane; wherein, when chamber and said cavity are inflated on the ground, said cavity is substantially entirely within the top and bottom planes.

31. The combination of claim 29 including:

air escape means through said central portion for egress of air from under said central portion when said heater is placed on liquid such that said lower film rests substantially on the liquid.

32. The combination of claim 29:

said valves being located near one edge; said heater adapted for deflation by rolling from an edge opposite said valves.

\* \* \* \* \*